June 4, 1968  E. EBERT ET AL  3,386,866
METHOD OF EPITAXIALLY GROWING A LAYER OF SILICON CARBIDE
ON A SEED BY PYROLYTIC DECOMPOSITION OF HYDROCARBONS
OR MIXTURES OF SILANES AND HYDROCARBONS
Filed Nov. 29, 1965
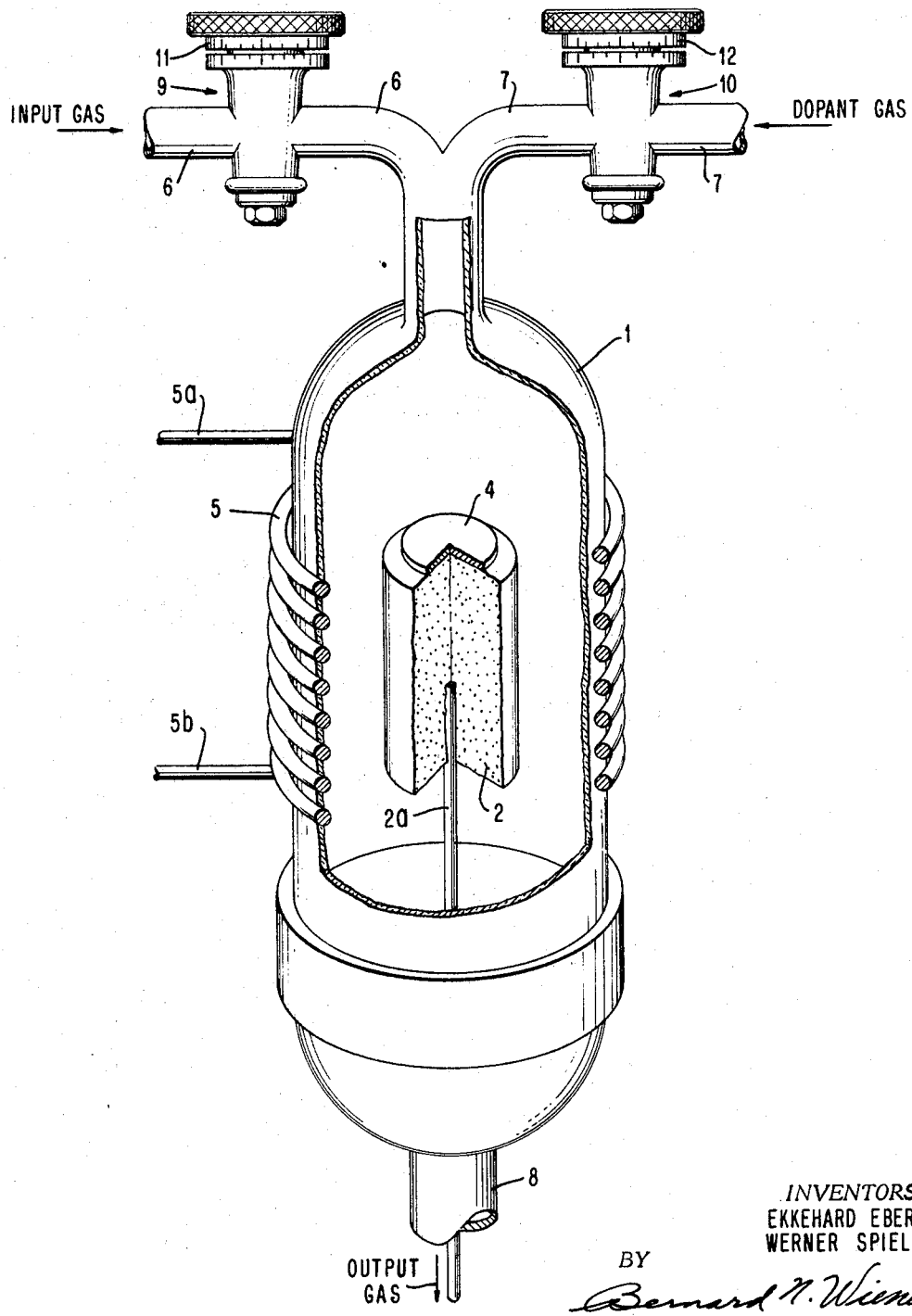
INPUT GAS
DOPANT GAS
OUTPUT GAS
INVENTORS
EKKEHARD EBERT
WERNER SPIELMANN
BY
Bernard N. Wiener
ATTORNEY

United States Patent Office 3,386,866
Patented June 4, 1968

---

3,386,866
METHOD OF EPITAXIALLY GROWING A LAYER OF SILICON CARBIDE ON A SEED BY PYROLYTIC DECOMPOSITION OF HYDROCARBONS OR MIXTURES OF SILANES AND HYDROCARBONS
Ekkehard Ebert, Boblingen, and Werner Spielmann, Dachtel, Germany, assignors to International Business Machines Corporation, Armonk, N.Y., a corporation of New York
Filed Nov. 29, 1965, Ser. No. 510,276
Claims priority, application Germany, Dec. 5, 1964, J 27,053
18 Claims. (Cl. 148—175)

This invention relates to a method of growing silicon carbide and to the silicon carbide element so provided, and it relates more particularly to a process for producing silicon carbide semiconductor components.

In copending patent application S.N. 472,615, filed July 16, 1965, and assigned to the assignee hereof, there is disclosed a method for epitaxially growing silicon carbide. In that method an input gas stream consisting of silianes and hydrocarbons is applied to a reaction chamber and is pyrolytically decomposed in the vicinity of a substrate seed of silicon carbide therebf producing epitaxial growth of a layer of monocrystalline silicon carbide on the seed. By addition of suitable doping gas during the growth, desirable semiconductor junctions are obtained, e.g., a p-n junction.

However, the growth rate of the monocrystalline layer through the process of the copending patent application is not substantially higher than that obtained by prior art techniques. An increase in the growth rate is highly desirable. For example, with a slow growth of the layer because of diffusion phenomena, a p-n junction may not have the desired definition.

It is an object of this invention to provide a method of growing under vacuum condition a layer of silicon carbide through the pyrolytic decomposition of a gas including hydrocarbons in the vicinity of a monocrystalline substrate seed having silicon as a constituent therein.

It is another object of this invention to provide a method of epitaxially growing under vacuum condition a layer of silicon carbide through the pyrolytic decomposition of a gas mixture comprising monosilane ($SiH_4$) and propane ($C_3H_8$) in the vicinity of a substrate seed of a monocrystalline silicon carbide.

It is another object of this invention to provide a method of growing under vacuum condition a layer of silicon carbide through the pyrolytic decomposition of propane ($C_3H_8$) in the vicinity of a substrate seed of monocrystalline silicon.

It is another object of this invention to provide a method of epitaxially growing under vacuum condition silicon carbide through pyrolytic decomposition of a gas mixture comprising monosilane ($SiH_4$) and propane ($C_3H_8$) in the vicinity of a substrate seed of monocrystalline silicon.

It is another object of this invention to provide a semiconductor element, e.g., a resistance-type data converter, of silicon carbide obtained from the dissolution of a substrate seed having silicon as a constituent therein on which a monocrystalline layer of silicon carbide is obtained by the pyrolytic decomposition of a gas including hydrocarbons.

It is another object of this invention to provide a monocrystalline layer of silicon carbide by pyrolytic decompositoin of a gas including hydrocarbons at a beneficially low temperature and under adjustable vacuum conditions.

A layer of monocrystalline silicon carbide is provided by the practice of this invention using the pyrolytic decomposition of a gas including hydorcarbons. There is provision that, during the growing process of the silicon carbide layer on a monocrystalline substrate seed having silicon as a constituent therein, an adjustable vacuum is maintained in the reaction chamber for influencing the growth rate of the layer, e.g., between one torr and one hundredth torr.

In the practice of one feature of the invention, the layer of monocrystalline silicon carbide is produced by the pyrolytic decomposition under vacuum condition of a gas mixture of monosilane and propane in the vicinity of a monocrystalline substrate seed of silicon carbide.

In the practice of another feature of the invention, the gas which is pyrolytically decomposed consists of propane and the substrate seed upon which the monocrystalline layer of silicon carbide is grown is monocrystalline silicon.

In the practice of still another feature of the invention, the substrate seed upon which the layer of monocrystalline silicon carbide is epitaxially grown by the pyrolytic decomposition of monosilane and propane is monocrystalline silicon.

In the practice of a further feature of this invention, the layer of monocrystalline silicon carbide grown on a silicon seed is removed therefrom by dissolving the seed. The foil of monocrystalline silicon carbide thus obtained is especially suitable for use as a resistance-type data converter, e.g., a strain gauge or a temperature sensor.

It is an advantage of this invention that an adjustable growth rate of silicon carbide is achievable which is several times, e.g., ten, higher than that achieved previously. Illustratively, in growing polycrystalline SiC, it has been possible to achieve growth rates of 100 microns per minute.

It is another advantage of the practice of this invention that the silanes and hydrocarbons, as well as gases containing doping substances, are introduced into the reaction chamber by the vacuum, thereby eliminating the inert carrier gases formerly used which, like all of the substances used, must be of high purity.

It is another advantage of the practice of this invention that the vacuum is adjustable for the purpose of influencing the growth rate of the monocrystalline layer of silicon carbide on the seed.

It is still another advantage of the practice of this invention that during the growing process the SiC seed is heated to a temperature of approximately 1400° C. which contributes to reducing the aggressiveness of the reaction products, increasing the purity of the layers, and improving the sharpness of the semiconductor junctions.

The foregoing and other objects, features and advantages of the invention will be apparent from the following more particular description of a preferred embodiment of the invention as illustrated in the accompanying drawing.

The drawing is a schematic perspective view of a reaction chamber partially broken away to expose the monocrystalline substrate seed and the support therefor in the reaction chamber.

Feature I.—Epitaxial growth of layer of silicon carbide on silicon carbide seed by pyrolytic decomposition of monosilane and propane In the practice of one feature of this invention monosilane ($SiH_4$) and propane ($C_3H_8$) are pyrolytically decomposed in the vicinity of the surface of a substrate seed of monocrystalline silicon carbide. There results an epitaxially grown layer of monocrystalline silicon carbide on the surface of the seed. This feature will now be described with reference to the drawing.

A graphite or tantalum block 2 is mounted in the reaction chamber 1, which consists of quartz, on support 2a. The graphite block 2 supports a seed 4 of monocrystalline silicon carbide on the surface of which is to be applied a monocrystalline layer of silicon carbide by epitaxial growth. The block 2 and seed 4 are heated to a temperature of approximately 1400° C. by means of the induction coil 5. Power is applied to induction coil 5 via terminals 5a and 5b by a power source, not shown.

An input gas mixture comprising monosilane ($SiH_4$) and propane ($C_3H_8$) is directed into the reaction chamber via valve 9 through pipe 6 so that directly above the surface of the SiC seed 4, the mixture is decomposed into silicon carbide and hydrogen causing SiC to grow epitaxially on the seed.

An additional gas mixture having a semiconductor doping action may be introduced to reaction chamber 1 via valve 10 through the pipe 7. For example, for n-type doping, gaseous phosphorus hydride (phosphine, $PH_3$) or nitrogen ($N_2$); and for p-type doping, a gaseous hydroboron (diborane, $B_2H_6$) or an aluminum-borane compound $Al(BH_4)_3$ is introduced into the reaction chamber 1 where it blends with the gas mixture introduced through pipe 6.

During the epitaxial growth process, a pump (not shown) connected to the exhaust pipe 8 is operated to maintain an adjustable vacuum in the reaction chamber for influencing the growth rate of the layer, e.g., between one torr and one hundredth torr, and thereby the gases applied via the pipes 6 and 7 are controllably introduced into the reaction chamber 1. The vacuum is adjustable very accurately by means of the micrometer screws 11 and 12 attached to the valves 9 and 10 of pipes 6 and 7, respectively, and the growth rate of the monocrystalline layer of silicon carbide is thereby adjustably controlled.

Feature II.—Growth of monocrystalline layer of silicon carbide on silicon seed by pyrolytic decomposition of propane In the practice of another feature of the invention, a layer of monocrystalline silicon carbide is obtained by the pyrolytic decomposition of propane ($C_3H_8$) in the vicinity of a monocrystalline silicon seed. This feature will now be described with reference to the drawing.

Inside the quartz reaction chamber 1, a thin plate seed 4 of monocrystalline silicon is secured to the graphite block 2, which is supported by support 2a. Block 2 and seed 4 are heated by means of the induction coil 5, energized via terminals 5a and 5b by a power source, not shown, to a temperature within the range 1100° C. to 1300° C. Propane gas ($C_3H_8$) is supplied to reaction chamber 1 via valve 9 through pipe 6 while pipe 8 is joined by a pump, not shown, creating an adjustable vacuum pressure in chamber 1 for influencing the growth rate of the layer, e.g., between one torr and one hundredth torr. The propane gas is pyrolytically decomposed in the immediate vicinity of the surface of silicon seed 4, and the resulting carbon atoms combine with the silicon atoms of the seed to form a monocrystalline silicon carbide layer in the region of the surface thereof. The thickness of the layer has been made to be approximately one micron. The resulting layer of monocrystalline silicon carbide may be thickened still further by supplying monosilane ($SiH_4$) through the pipe 7. Due to the pyrolytic decomposition of the silane and propane, the SiC layer continues to grow epitaxially until the desired thickness is attained. The micrometer screws 11 and 12 of valves 9 and 10 in pipes 6 and 7, respectively, enable very accurate regulation of the supply of input gas and the supply of dopant gas.

After cooling, the layer and seed may be immersed desirably in a solvent for silicon, e.g., fluoric acid and hydrochloric acid. The pure silicon seed passes into solution and an SiC foil which is insoluble in the solvent is obtained.

Feature III.—Epitaxial growth of layer of silicon carbide on silicon seed by pyrolytic decomposition of monosilane and propane In the practice of this feature of the invention a monocrystalline layer of silicon carbide is epitaxially grown on the surface of a substrate seed of monocrystalline silicon by pyrolytic decomposition of monosilane ($SiH_4$) and propane ($C_3H_8$) in the vicinity thereof. This feature will now be described with reference to the drawing.

In reaction chamber 1 a small wafer of monocrystalline silicon which serves as seed 4 is attached to a block of graphite 2. The graphite block 2 and the silicon seed 4 are heated to about 1300° C. by the induction coil 5 which is energized via terminals 5a and 5b by a power source, not shown.

A stream of gas consisting of monosilane ($SiH_4$) and propane ($C_3H_8$) is passed into the reaction chamber 1 via valve 9 through pipe 6. Pyrolytic decomposition of the gas takes place in the immediate vicinity of the surface of the silicon seed 4. The result is that silicon and carbon atoms are released which combine to form SiC and a monocrystalline layer of silicon carbide growth on seed 4. An adjustable vacuum pressure is maintained in the reaction chamber 1 during the growing process for influencing the growth rate of the layer, e.g., from one torr to one hundredth torr. The amount of propane introduced to reaction chamber 1 is accurately adjusted by means of micrometer screw 11 of valve 9 in pipe 6.

After cooling, the layer and seed may be immersed desirably in a solvent for silicon, e.g., fluoric acid and hydrochloric acid. The pure silicon seed passes into solution and an SiC foil which is insoluble in the solvent is obtained.

Feature IV.—Resistance-type data converter

In the practice of this feature of the invention, the layer of monocrystalline silicon carbide produced by the practice of Feature II or Feature III is used as a resistance-type data converter. In order to be so used desirably, it is first removed from the silicon seed upon which it was grown.

After the structure of seed and layer of monocrystalline silicon by the practice of Feature II or Feature III is cooled, it may be immersed desirably in a solvent for silicon, for example, fluoric acid and hydrochloric acid. The result is that the pure silicon seed 4 passes into solution, while the SiC foil which is insoluble in the solvent remains behind. The SiC foil is especially suitable for use as a resistance-type data converter.

The resistance-type data converter provided by this feature of the invention comprises a thin foil of monocrystalline silicon carbide (SiC) which exhibits a series of advantageous qualities for use as a sensor, e.g., for strain or temperature. Its mechanical hardness is close to that of the diamond, it has a very high melting point of approximately 1800° C., and it is quite chemically resistant. Hitherto, attempts to produce such a thin foil of monocrystalline SiC have been unsuccessful.

In the following discussion there is presented background material concerning resistance-type data converters.

In the investigation of physical processes, there is increased importance being attached to sensors in the form of thin strips. Their advantageous properties include small space occupied, robustness, high sensitivity, long life, and favorable frequency response. Sensors of this kind are used chiefly as strain gauges for measuring mechanical magnitudes. Among the properties of such a strip subjected to mechanical stress, besides changes in length, in structure (e.g., brittleness) as well as changes in the acoustic and optical qualities, variations in the electrical resistance are usually used as a measuring magnitude. Their data converter characteristic which is suitable for long distance electrical transmission, renders these resistance-type gauges particularly suitable for a diversity of applications, e.g., in the measurement of forces, pressures, accelerations, and moments.

Under mechanical stress, the electrical resistance of a metal wire does not always change in accordance with its geometric dimensions. There may be a stress response of the electrical resistance which is characteristic for the particular material and is determined not only by the specific resistance but also by the modulus of elasticity and by Poisson's ratio of the material. In the prior art, materials have been provided in which the resistance response is linear, extending from elongation within the entire elastic range into the region of plastic deformation. Usually the materials consist of alloys of copper, nickel, chromium, iron and aluminum.

Heretofore, monocrystals of semiconductors, particularly silicon and germanium, have been utilized as resistant-type data converters. The crystal structure is known and theory enables predictions to be made regarding the resistance-elongation relation of the particular material. The resistance sensitivity of these materials under mechanical stress is 100 to 300 times greater than in the case of metal alloys. Further, from the known energy gap between the valence band and the conductivity band of the particular semiconductor, predictions can be made concerning the resistance-temperature behavior of such a substance, from which it is possible to forecast its suitability as a temperature sensor.

A known sensor is the semiconductor component comprising a thin p-conducting zone diffused into an n-conducting monocrystalline silicon layer. With a suitable bias voltage, the n-conducting layer is electrically insulated from the p-conducting layer, so that a thin monocrystalline semiconductor strip is available which can be used as a measuring gauge. This gauge has the disadvantage that it cannot be separated from its silicon substrate. Moreover, the p-n-junction is sensitive to temperature, so that difficulties also arise when it is used as a temperature sensor.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Method of growing in a reaction chamber a monocrystalline layer of silicon carbide on a monocrystalline seed having silicon as a constituent therein comprising the steps of:
   maintaining a vacuum in said reaction chamber;
   applying an input gas stream comprising $SiH_4$ and $C_3H_8$ to said evacuated chamber; and
   decomposing pyrolytically said gas stream in said chamber to effect said growing of said layer on said seed.

2. Method according to claim 1 wherein said vacuum is adjustable between on torr and one hundredth torr for influencing the growth rate of said layer.

3. Method according to claim 1 wherein said input gas stream includes a semiconductor dopant gas to obtain doping of said layer.

4. The method of claim 1 wherein said seed is silicon.

5. Method according to claim 4 including the further step of dissolving said silicon seed after said growing of said layer thereon.

6. Method according to claim 5 wherein said dissolving of said silicon seed is by means of a solvent consisting of fluoric acid and hydrochloric acid.

7. The method of claim 8 wherein a foil is formed.

8. The method of claim 7 wherein said foil is approximately one micron thick.

9. The method of claim 1 wherein said seed is silicon carbide.

10. Method according to claim 9 wherein said silicon carbide seed is heated to a temperature of approximately 1400° C. during said growing of said monocrystalline layer.

11. Method of growing in a reaction chamber a monocrystalline layer of silicon carbide on a monocrystalline seed of silicon comprising the steps of:
    maintaining a vacuum in said reaction chamber during said growing of said layer;
    applying an input gas stream consisting essentially of hydrocarbons to said evacuated chamber; and
    decomposing pyrolytically said hydrocarbons in the immediate vicinity of the surface of the silicon seed, such that resulting carbon atoms combine with silicon atoms of the seed to form a monocrystalline silicon carbide layer.

12. Method according to claim 11 wherein said vacuum is adjustable between one torr and one hundredth torr for influencing the growth rate of said layer.

13. Method according to claim 11 wherein said input gas stream includes propane ($C_3H_8$).

14. Method according to claim 11 wherein said seed is heated to a temperature within the range of 1100° C. to 1300° C. during said growing of said layer of monocrystalline silicon carbide.

15. Method according to claim 11 including the further step of dissolving said silicon seed after said growing of said layer thereon.

16. Method according to claim 15 wherein said dissolving of said silicon seed is by means of a solvent consisting of fluoric acid and hydrochloric acid.

17. The method of claim 15 wherein a foil is formed.

18. The method of claim 17 wherein said foil is approximately one micron thick.

References Cited

UNITED STATES PATENTS

| | | | |
|---|---|---|---|
| 3,025,192 | 3/1962 | Lowe | 148—174 XR |
| 3,147,159 | 9/1964 | Lowe | 148—175 XR |
| 3,099,523 | 7/1963 | Reuschez et al. | 23—208 XR |
| 3,157,541 | 11/1964 | Heywang et al. | 148—174 |
| 3,177,100 | 4/1965 | Mayer et al. | 148—175 |
| 3,228,756 | 1/1966 | Hergenrother | 23—301 |
| 3,340,110 | 9/1967 | Grabmaier et al. | 148—174 XR |

OTHER REFERENCES

RCA Technical Notes, TN No. 523, March 1962, Pankove et al.

HYLAND BIZOT, *Primary Examiner.*

P. WEINSTEIN, *Assistant Examiner.*